United States Patent [19]
Blemberg et al.

[11] Patent Number: 5,424,347
[45] Date of Patent: Jun. 13, 1995

[54] MA-PVDC FORMULATIONS, FILMS, AND STRUCTURES WHICH MAINTAIN HIGH BARRIER PROPERTIES AFTER RETORTING

[75] Inventors: Robert J. Blemberg, Appleton; John P. Eckstein, Neenah; Mark E. Nordness, Appleton, all of Wis.

[73] Assignee: American National Can Company, Del.

[21] Appl. No.: 32,442

[22] Filed: Mar. 16, 1993

Related U.S. Application Data

[63] Continuation of Ser. No. 458,483, Dec. 28, 1989, abandoned.

[51] Int. Cl.⁶ ................................................ C08K 5/15
[52] U.S. Cl. ................................ 524/109; 524/371; 524/417; 524/433; 524/436
[58] Field of Search ............... 526/329.4, 173, 235; 524/109, 371, 417, 433, 436

[56] References Cited

U.S. PATENT DOCUMENTS

| | | | |
|---|---|---|---|
| 2,160,945 | 6/1939 | Wiley | 526/329.4 |
| 2,810,715 | 10/1957 | Jordan, Jr. | 526/329.4 |
| 3,477,099 | 11/1969 | Lee et al. | |
| 3,557,041 | 1/1971 | Loshaek et al. | 526/329.4 |
| 3,558,330 | 1/1971 | Widiger et al. | |
| 3,793,259 | 2/1974 | Brinkmann et al. | 526/329.4 |
| 3,821,182 | 6/1974 | Baird, Jr. et al. | 526/329.4 |
| 3,840,620 | 10/1974 | Gallagher | 526/329.4 |
| 3,882,198 | 5/1975 | Miller | 526/329.4 |
| 4,351,929 | 9/1982 | Gibbs et al. | 526/329.4 |
| 4,371,677 | 2/1983 | Morningstar et al. | 526/329.4 |
| 4,379,117 | 4/1983 | Baird, Jr. et al. | |
| 4,383,071 | 5/1983 | Lawson et al. | 524/436 |
| 4,546,135 | 10/1985 | Engelmann et al. | 526/329.4 |
| 4,686,148 | 11/1987 | Havens | |
| 4,714,638 | 12/1987 | Lustig et al. | |
| 4,755,402 | 7/1988 | Oberle | |
| 4,804,510 | 2/1989 | Luecke et al. | |
| 4,842,791 | 6/1989 | Gould et al. | |
| 4,945,134 | 7/1990 | Wallace et al. | 526/329.4 |
| 4,965,136 | 10/1990 | Mueller | 524/109 |
| 5,002,989 | 3/1991 | Naumovitz et al. | 524/436 |
| 5,030,511 | 7/1991 | Moffitt | 524/109 |

FOREIGN PATENT DOCUMENTS

| | | | |
|---|---|---|---|
| 631317 | 11/1961 | Canada | 526/329.4 |
| 1423666 | 11/1965 | France | |
| 53-104395 | 9/1978 | Japan | 526/329.4 |
| 524975 | 8/1940 | United Kingdom | 526/329.4 |
| 651579 | 4/1951 | United Kingdom | 526/329.4 |
| 1100398 | 1/1968 | United Kingdom | 526/329.4 |
| 1171245 | 11/1969 | United Kingdom | 526/329.4 |
| 2043533 | 10/1980 | United Kingdom | |
| 8903412 | 4/1989 | WIPO | |
| 91/01347 | 2/1991 | WIPO | 524/436 |
| 91/03518 | 3/1991 | WIPO | 524/436 |

OTHER PUBLICATIONS

1046-TMOG 2 Official Gazett, Sep. 4, 1984.
World Patents Index Latest, accession No. 89-312860 week 43, Derwent Publications, Ltd. GB.

*Primary Examiner*—Joseph L. Schofer
*Assistant Examiner*—N. Sarofim
*Attorney, Agent, or Firm*—Mary J. Schnurr

[57] ABSTRACT

Disclosed and claimed are formulations of polyvinylidene chloride, methyl acrylate and substantially no ethylene vinyl acetate which have high gas, especially oxygen, barrier properties and which maintain said high gas, especially oxygen, barrier properties after retorting; films and film-packages such as pouches from such formulations; and, methods of preparing foods employing such film-packages.

9 Claims, 1 Drawing Sheet

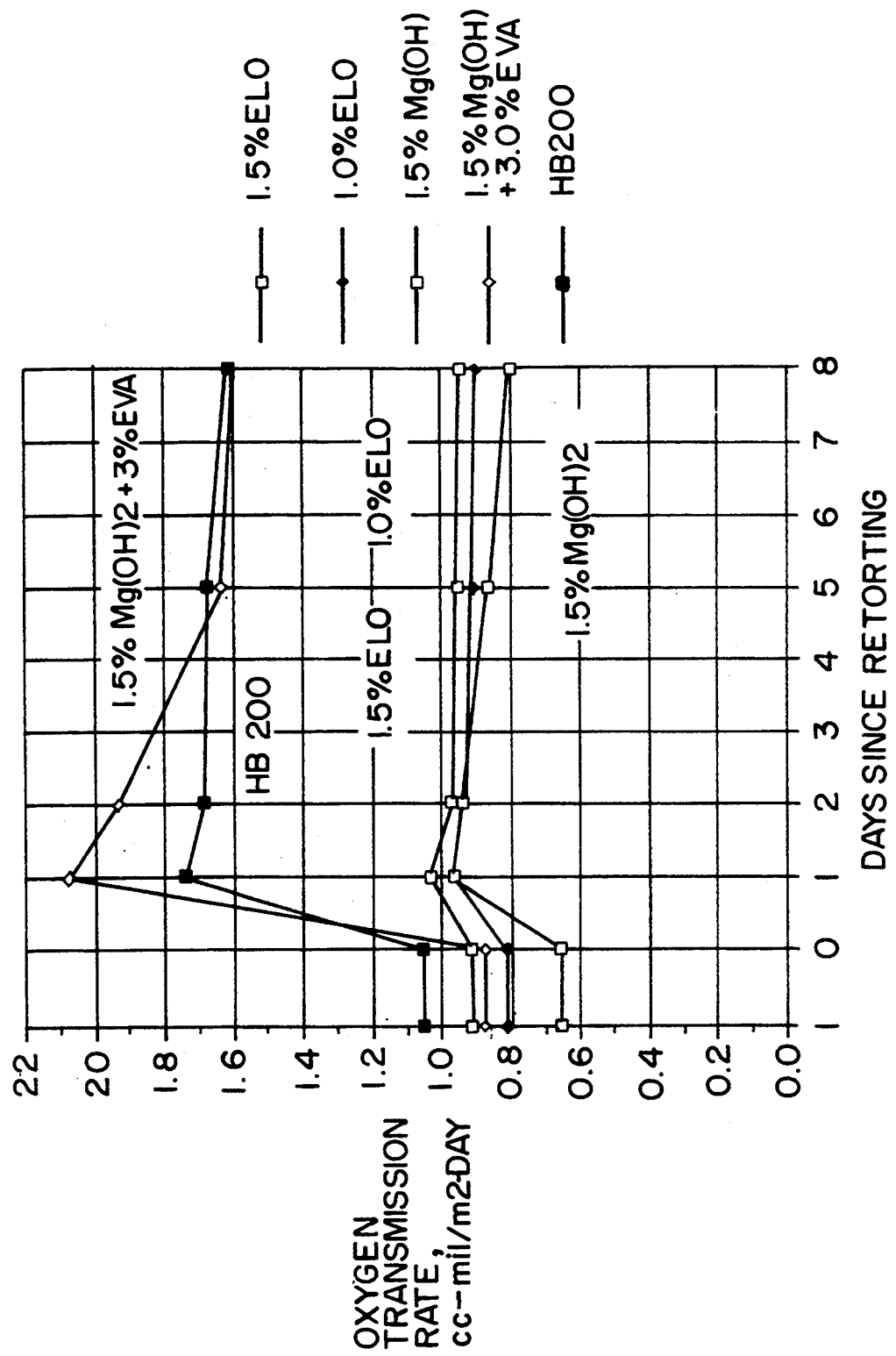

MA-PVDC FORMULATIONS, FILMS, AND STRUCTURES WHICH MAINTAIN HIGH BARRIER PROPERTIES AFTER RETORTING

This application is a continuation of U.S. patent application Ser. No. 07/458,483, filed 28 Dec. 1989, now abandoned.

This invention relates to polymeric barrier materials which have high gas, especially oxygen barrier properties and which maintain these desirable properties even when subjected to the rigors of retorting. More specifically, this invention relates to polyvinylidene chloride copolymer formulations, particularly formulations consisting essentially of polyvinylidene chloride-methyl acrylate copolymer which have and maintain high gas, especially oxygen, barrier properties even after retorting.

BACKGROUND OF INVENTION

Retorting is a process commonly used to prepare foods as well as sterilize them or other materials such as medical supplies, etc. in their packaging prior to distribution; e.g., to cook the foods within the packaging and kill microorganisms such as bacteria in the materials as well. Retorting is a heating process comprising subjecting the packaged contents to heat such as from heated or boiling water, or steam at an elevated temperature typically about 212° to 275° F. Heated water above 212° F. can be used in retorting with the appropriate pressure.

Pouches as packaging for retorting exist: see, e.g., U.S. Pat. Nos. 4,190,477, 4,311,742, 4,360,550 and 4,424,256. A feature common to these prior art pouches is a layer of metal foil. The foil is a gas barrier which maintains such properties even after the rigors of retorting.

Consumers use microwave ovens to prepare or reheat prepackaged foods. Likewise, industry may desire to employ microwave processes for preparing and sterilizing packaged materials. As is well known, metal objects generally are not to be used in microwave processes such as microwave oven food preparation, reheating or microwave pasteurization. Thus, packaging having a foil layer is ill-suited to many of the needs of today.

For instance, food prepared, packaged and sold for preparation/reheating in the package by the consumer may not be able to meet the needs of the consumer if he cannot employ a microwave oven to prepare/reheat the food for consumption because the package has a foil layer. Furthermore, if such prepackaged food cannot be subjected to microwave preparation/reheating, it simply may not be desirable to the consumer having a microwave oven and desiring to enjoy its benefits in preparation/reheating food, e.g., speed of preparation, less generation of radiant heat, etc. Likewise, commercial purchasers may object to packaging for their products if the packaged products cannot be subjected to microwave pasteurization.

Thus there is a great demand for packaging which does not have a foil layer.

However, retorting and microwave processes subject packaging to extreme conditions: high temperature; pressurized and/or heated water or steam, etc. With respect to microwave processes, it is noted that water in a packaged material may be converted to steam, thereby subjecting the packaging to conditions akin to retorting conditions. Therefore, there is a great demand for packaging which can withstand the rigors of retorting conditions while not having a foil layer.

Polyvinylidene chloride copolymers are supplied as resins, e.g., Dow Chemical markets resins under the mark Saran. These Saran resins are known as VC Saran and MA Saran. Dow manufactures single layer VC Saran film under the name HB Saran. MA Saran is a methyl acrylatepolyvinylidene chloride copolymer. For reference, mention is made of WO 89/03411 (International Application No. PCT/US 88/03515; Priority Application U.S. application Ser. No. 107,141, filed Oct. 9, 1987) and WO 89/3412 (International Application No. PCT/US88/03516; Priority Application U.S. application Ser. No. 107,137, filed Oct. 9, 1987), each of which being hereby incorporated herein by reference. These International Applications not only relate to polyvinylidene chloride copolymers and compositions thereof, but, these documents evince the current thinking with respect to such copolymers and compositions.

In these International Applications, it is recognized that films or other articles can be formed from polyvinylidene chloride copolymers and that these articles "should" have low-gas permeabilities to, for example, oxygen, carbon dioxide, water vapor, odor bodies, flavor bodies, hydrocarbons or agricultural chemicals.

However, to obtain such articles, the resins of the polyvinylidene chloride copolymers must be extruded. Therein lies a problem. When no modifiers are used with the resins, the melt viscosity of the resins is so high and the load on the extruder screw is so large such that the copolymers are subject to thermal degradation. The decomposed copolymers may generate undesirable levels of carbon and hydrochloric acid in the extrudate.

Moreover, as recognized in the aforementioned International Applications, in order to industrially extrude resins of polyvinylidene chloride copolymers without thermal decomposition and discoloring "a relatively large amount of a stabilizer and a plasticizer would inevitably" be incorporated into the resins.

In the art, it has been taught that ethylene vinyl acetate (EVA) can be added to resins of polyvinylidene chloride copolymers to improve extrudability without a significant concomitant loss in barrier properties. In fact, EVA-containing extrusion-aiding additives for polyvinylidene chloride copolymer formulations have been preferred by the art. Furthermore the art has equated EVA with other additive materials such as epoxidized oils in regard to EVA's plasticizer and lubricant characteristics. However, neither the aforementioned International Applications nor other publications relating to uses of polyvinylidene chloride copolymer extrudates, see, e.g., U.S. Pat. No. 4,714,638, recognize that retorting conditions can adversely affect the barrier properties of polyvinylidene chloride copolymer extrudates.

It has now been found that many packaging materials, particularly polymeric films suffer deterioration of their desirable properties such as gas barrier properties when subjected to retorting conditions. After retorting, the packaging materials become more permeable to gases such as oxygen and air, leading to a decreased shelf life for the materials within the package.

Ethylene-vinyl alcohol (EVOH) has been employed as an oxygen barrier in formulations for packaging materials. However, EVOH is moisture sensitive. It absorbs water during retorting and like processes and this reduces its oxygen barrier properties. With the passage of time and the loss of moisture, there is some barrier recovery. However, the packaged materials may already have suffered oxidative spoilage.

Films from the Saran resins have been known to be good gas barriers, unaffected by the retort process. Or, the art simply did not recognize that retorting conditions adversely affected films, particularly certain films as discussed below, from the Saran resins. It has been found, however, that as a result of retorting, HB Saran films suffer from an increase in oxygen permeability of at least approximately 30–70%. This increase in oxygen permeability is observed even though the HB Saran does not contain EVA. Similarly, films from MA Saran having EVA as an extrusion-aiding additive and other films made with methyl acrylate-polyvinylidene chloride copolymers blended with ethylene vinyl acetate suffer from an increase in permeability of at least approximately 30–100% as a result of retorting.

It is a principal object of this invention, therefore, to provide novel methyl acrylate-polyvinylidene copolymer compositions suitable for forming novel gas barrier films which will maintain their gas barrier properties under conditions of severe stress such as retorting.

SUMMARY OF INVENTION

It has now been surprisingly found that blends comprising methyl acrylate (MA)-polyvinylidene chloride (PVdC) copolymer which are substantially free of ethylene vinyl acetate (EVA), do not suffer a significant decrease in oxygen barrier properties when and after being subjected to retorting or similar stresses. The blends of this invention comprising MA-PVdC copolymers which are substantially free of EVA are suitable for use as gas impermeable films for packaging various materials which, when packaged, are subjected to retorting conditions such as foods, medical supplies, and the like. The blends of this invention can contain plasticizers or stabilizers which do not detract from or which even further enhance post-retort gas barrier properties.

The present invention provides novel compositions and packaging films comprising MA-PVdC copolymers which are substantially free of EVA. It also provides methods of packaging materials utilizing such films and for thermally processing such materials and packages, for example by retorting. The materials, e.g., foods, etc. may be safely heated or otherwise prepared for consumption or other uses with a microwave oven or other heat source.

BRIEF DESCRIPTION OF DRAWING

FIG. 1 is a graph showing oxygen permeability of various films as a function of time.

DETAILED DESCRIPTION

The blends of the present invention having improved post-retort gas barrier properties comprise polyvinylidene chloride-methyl acrylate copolymer and essentially no EVA. It has been surprisingly found that MA-PVdC copolymer formulations which contain EVA, even in small amounts, are adversely affected by the retort process, and that the gas barrier properties of MA-PVdC copolymer formulations which do not contain EVA are remarkably less adversely affected by the retort process. Thus, the formulations of the present invention contain substantially no EVA.

Indeed, given that films from Saran resins were thought to be unaffected by retorting conditions, or that the art simply did not recognize that certain films from Saran resins are adversely affected by retorting conditions, and that films from polyvinylidene chloride vinyl chloride copolymers not containing EVA have reduced post-retort barrier properties, it is quite surprising not only to discover that films from MA Saran (or MA-PVdC copolymer) which contain EVA are adversely affected by retorting conditions, but to also discover that this reduction in barrier properties is critically dependent upon the plasticizer. More particularly, since films from polyvinylidene chloride copolymer resins were thought to be unaffected by retorting conditions, or the art simply did not recognize the problem of post-retort barrier reduction, it is quite unexpected to discover barrier reduction in films from these resins. Additionally, to discover with respect to films from MA-PVdC copolymers that this barrier reduction is critically dependent upon the presence of the plasticizer EVA is even more unexpected since PVdC-vinyl chloride copolymers and compositions therefrom and MA-PVdC copolymers and compositions therefrom have been thought to be equivalent, since plasticizers for both said PVdC copolymers have also been thought to be equivalent, since EVA or EVA-containing plasticizers have been preferred extrusion-aiding additives, and since post-retort barrier reduction occurs with films from PVdC-vinyl chloride, regardless of whether EVA is present.

In the MA-PVdC copolymers employed in the present invention, the methyl acrylate is preferably present in an amount of 3 to 8% by weight, more preferably from 6 to 8% by weight, based upon the total weight. However, it is contemplated to use MA-PVdC copolymers where the upper limit for the methyl acrylate content is up to about 12% and even up to about 15% methyl acrylate in some instances.

Plasticizers, stabilizers, or lubricants as recognized in the art are employed for extrusion or processing. In blends of the present invention, these additives can be present in an amount of from about 0.5 to 3% by weight, preferably about 1 to 1.5% by weight based on the total weight. Such stabilizers include epoxidized linseed oil (ELO), magnesium hydroxide, magnesium oxide, tetra sodium pyrophosphate, epoxidized soybean oil, Bisphenol A/Epichlorohydrin (Shell EPON 828), or mixtures thereof. Presently, epoxidized linseed oil and magnesium hydroxide are preferred stabilizers. Epoxidized linseed oil is commercially available as Vikoflex 7190 (Viking Chemical Company). While some variation is possible, it has been observed that stabilizer concentrations appreciably above 3% may significantly deteriorate the gas barrier properties.

The blends of the present invention can be extruded into films which are then, by conventional techniques, formed into packages such as pouches, lid stock, barrier sheets, or other articles to be subjected to retorting conditions. Such films and packages are included within the term "film-package" used herein. Although the blends of the present invention can be used as a single layer film, in preferred embodiments they are employed in multi-layer extrudates and laminates utilizing at least one outer film layer. They can also be used to form sheets, tubes and containers as well.

Films of the present invention, either as a single layer or in a coextrudate or laminate can be produced by any of the conventional processes such as extrusion, coextrusion, extrusion coating, extrusion lamination, cast coextrusion, blown coextrusion, adhesive lamination, and the like, and combinations thereof. If desired, e.g., for a particular end use, the films or laminates may be oriented by conventional processes such as blown tubular orientation, stretch orientation, or molecular orientation. They may be shrinkable if not heat set. They may also be cross-linked by conventional processes such as by irradiation, heat, or the addition of cross-linking agents. These latter processes should be conducted with care to avoid adversely affecting the post-retort gas barrier properties and/or PVdC degradation. For background on films and apparatus for producing them, reference is made to U.S. Pat. Nos. 3,477,099, 4,755,402, 3,558,330, 4,714,638, 4,842,791, containing EVA), Admer (Mitsui, No. AT469C), Bynel (Du Pont, E361 or 3036), and Plexar 3342. Admer, Bynel and Plexar 3342 are believed to be maleic anhydride modified polyolefins.

Films of the present invention (either single or multilayer) can be the same thickness as conventional films, i.e. about 2.0 mils (0.051 mm) with a normal range of about 1.5 to about 3.0 mils (0.038-0.076 mm). Conventionally, it has been thought that films thinner than about 1.5 mils (0.038 mm) tend to be too weak to perform their required functions. However, a single layer of a film of the present invention can be about ¾ mil or thicker. Films thicker than about 3.0 mils (0.076 mm) are economically less competitive, although films up to about 20 mils (0.51 mm) are functional. Sheet structures of the present invention from 20 to 200 mils may be economical for rigid plastic packages. This sheet can be used to thermoform trays or other rigid containers.

Films or sheets of the present invention, either single or multilayer, can be formed into a finished package or "film-package", such as a pouch, by conventional methods, e.g., by forming heat or adhesive seals about the periphery of the shape to be formed into a pouch. For instance, if a square pouch such as a retort pouch is desired, a rectangular film twice the desired length of the pouch is folded, the two parallel sides of the periphery (perpendicular to the fold) heat or adhesive sealed, the food or other material to be packaged inserted therein, and then the remaining open side of the periphery is heat or adhesive sealed. Another method for making a typical retort pouch is by sealing on three sides face-to-face films, filling the thus formed open pouch with food or whatever material is to be packaged therein, and then sealing the fourth side.

For background on pouches and their production, reference is made to U.S. Pat. Nos. 4,190,477, 4,311,742, 4,360,550, and 4,424,256, each of which being hereby incorporated herein by reference.

Retort pouches are usually filled with food, medical supplies, blood, etc., although the contents of the package is not a limitation of the invention. The packages of the invention are, however, especially useful as retort pouches. Sealed retort pouches and other packages such as microwaveable trays containing food are usually heated or retorted at temperatures and times sufficient to achieve commercial sterilization as defined in Title 21, C.F.R., Part 113 (Definitions, Sec. 113.3) which states that, "Commercial sterility of thermally processed food means the condition achieved "(i) By the application of heat which renders the food free of "(a) Microorganisms capable of reproducing in the food under normal nonrefrigerated conditions of storage and distribution; and "(b) Viable microorganisms (including spores) of public health significance; or "(ii) By the control of water activity and the application of heat which render the food free of microorganisms capable of reproducing in the food under normal nonrefrigerated conditions of storage and distribution."

In general, to kill microorganisms such as bacteria in food or other materials, the temperature of heating and time thereof must be sufficient so that the food or other materials achieve a temperature of at least 140° F. The cooking of food and the killing of microorganisms therein or in said other materials can be achieved by heating or retorting the pouch containing said food or other materials at a temperature typically from about 212° F. to 275° F. for sufficient time, typically about from ½ hour up to an hour, although usually less than an hour. The said heating can be achieved by heated or boiling water, steam, heated steam or pressurized water or steam. Heated water can achieve temperatures greater than 212° F. with an appropriate adjustment of pressure. Heating can also be achieved in microwave pasteurization. The contents and the amount thereof in the pouch or package can be factors in the time and temperatures of heating.

The packages have been found to be efficient gas barriers without appreciable deterioration of the desired properties under retorting conditions, including "microwave conditions". In fact, of the many benefits of the present invention, it has been found that coextruded films of the present invention, e.g., wherein the core layer is from a MA-PVdC copolymer blend containing essentially no EVA, when substituted in the same thickness as films of PVdC-vinyl chloride copolymer blends in packaging for perishable materials has resulted in a longer shelf life for such materials. In addition, it has been found to be a benefit of the present invention that if longer shelf life is not needed, coextruded films of the present invention can be thinner than films of PVdC-vinyl chloride copolymer blends in packaging, thereby reducing costs. Thus, packaging of the present invention provides longer shelf life for perishables contained therein as well as economic benefits, especially when longer shelf life is not necessary.

With reference to packaging, a presently preferred structure for a film or sheet which can suitably be formed into a pouch comprises a plurality of superimposed layers comprising a first layer of a coextrudate of the present invention disposed between a second layer comprising PET and a third layer comprising a sealant, preferably a blown sealant such as PP, or ethylene, or sealant blends thereof. A commercially available product for use in a material suitable for blending as a sealant is Tafmer, e.g., Tafmer A (Mitsui Petrochemical), an alpha-olefin having elastomer-like properties. The film or sheet may be represented as PET/first layer/sealant. Preferably, this film or sheet is about 1.5 to 3 mils thick, more preferably about 2.0 mils thick.

The first layer coextrudate comprises a plurality of layers comprising a core layer disposed between a pair of first intermediate layers, the first intermediate layers each disposed between the core layer and a second intermediate layer, the second intermediate layers, each disposed between a first intermediate layer and an outer layer, and, the outer layers which comprise a first outer layer and a second outer layer; the core layer comprises MA-PVdC copolymer substantially free of EVA, preferably about 98.8% by weight MA-PVdC copolymer (e.g., Dow 119) having essentially no EVA and about 1.2% by weight ELO, the first intermediate layers comprise EVA, preferably a high VA EVA (e.g., Exxon LD-761, about 28% by weight VA), the second intermediate layers preferably comprise a PP-based adhesive or tie resin with Exxon 5610A-2 being noted as a particularly useful PP-based adhesive or tie resin; the first outer layer preferably comprising a blend of PP (e.g., Fina 3622), white PP concentrate (e.g., Chroma P20192A) and EVA (especially a high VA EVA, e.g., Exxon LD-761), more preferably comprising about 80% by weight PP, about 10% by weight white PP concentrate, and about 10% by weight EVA; and, the second outer layer preferably comprising PP (e.g., Fina 3622) and EVA (especially a high VA EVA), more preferably comprising 90% by weight PP and 10% by weight EVA. This first layer, in a preferred embodiment, may be represented as: 80% PP, 10% white PP concentrate, 10% EVA/PP-based adhesive/EVA/98.8% MA-PVdC copolymer, 1.2% ELO/EVA/PP-based adhesive/90% PP, 10% EVA. A preferred embodiment of this first layer comprises about 40% by weight core layer, about 3% by weight first intermediate layers, especially about 1.5% by weight each first intermediate layer, about 7% by weight second intermediate layers, especially about 3.5% by weight each second intermediate layer, and about 50% by weight outer layers, especially about 30% by weight for said first outer layer and about 20% by weight for said second outer layer.

A presently preferred structure for a film or sheet which can suitably be formed into a lid stock comprises a plurality of superimposed layers comprising a first layer of a coextrudate of the present invention disposed between a second layer and a third layer, said second and third layers preferably comprising PET, and a fourth layer as an outer layer such that one of the said second or third layers is disposed between the said first layer and the fourth layer; said fourth layer preferably comprising a sealant, such as PP, a PP copolymer or a coextruded film containing a blend such as PP/Taffmer. This film or sheet may be represented as PET/first layer/PET/sealant. Preferably, this film or sheet is about 1.5 to 3.0 mils thick, especially about 2 to 3 mils thick, and more preferably about 2.75 mils thick.

In one embodiment, this first layer coextrudate comprises a plurality of superimposed layers comprising a core layer disposed between a first outer layer and a second outer layer. The core layer comprises MA-PVdC copolymers which are substantially free of EVA. The core layer preferably comprises MA-PVdC copolymers containing essentially no EVA, and ELO, more preferably 98.8% by weight MA-PVdC copolymer, (e.g., Dow 119) having essentially no EVA, and 1.2% by weight ELO. The first and second outer layers being as above-stated for the first and second outer layers of the first layer of the film or sheet which can be formed into a pouch. In this instance, the said first layer coextrudate preferably comprises 30 to 40% by weight of the first outer layer, 40 to 50% by weight of the core layer, and 20 to 30% by weight of the second outer layer.

In a second embodiment, the first layer coextrudate comprises a plurality of layers comprising a core layer disposed between a pair of first intermediate layers, each disposed between the core and a second intermediate layer, the second intermediate layers, each disposed between a first intermediate layer and an outer layer, and the outer layers comprising a first outer layer and a second outer layer; wherein said first and second intermediate layers and said outer layers are as described above for the same of the first layer of the film or sheet suitable for forming a pouch, and said core layer comprising MA-PVdC copolymer substantially free of EVA, preferably comprising MA-PVdC copolymer containing essentially no EVA, and ELO, and more preferably comprising 98.8% by weight MA-PVdC having essentially no EVA and 1.2% by weight ELO. In this instance, the first layer preferably comprises the same weight percentages of core, first intermediate, second intermediate, first outer and second outer layers as stated above for the first layer of the film or sheet suitable for forming into a pouch.

In yet another embodiment, the first layer comprises a plurality of superimposed layers comprising a core layer, first and second intermediate layers, and first and second outer layers disposed as above-stated for the second embodiment of the first layer for the film or sheet suitable for forming a lid stock. In this embodiment, the core layer and the weight percentages of core, first intermediate, second intermediate, first outer and second outer layers are also as stated above for the second embodiment of the first layer of the film or sheet suitable for forming a lid stock. However, in this embodiment, the first intermediate layers comprise EVA (especially a high VA EVA, e.g., Exxon LD-761, 28% VA EVA) and PP-based adhesive (e.g., Exxon 5610A-2), preferably, 30% by weight EVA and 70% by weight PP-based adhesive; the second intermediate layers comprise PP (e.g., Fina 3622), EVA (especially a high VA EVA) and PP-based adhesive, preferably 80% by weight PP-based adhesive, 10% by weight PP and 10% by weight EVA; the first outer layer comprises PP, PP-based adhesive, and white PP concentrate (Chroma P20192A or Ampacet), preferably 75% by weight PP, 10% by weight PP-based adhesive, and 15% by weight white PP concentrate; and, the second outer layer comprises PP and PP-based adhesive, preferably 80% by weight PP and 20% by weight PP-based adhesive.

The following non-limiting examples are given by way of illustration only and are not to be considered limitations of this invention, many apparent variations of which are possible without departing from the spirit or scope thereof.

EXAMPLES

Examples 1–5

The accompanying FIG. 1 graphically illustrates the post-retort barrier properties of the films of the invention. Five films, were prepared from formulations as set forth below and tested for oxygen permeability from the day before to eight days after retorting. The results of the testing are set forth graphically in FIG. 1 wherein the PVdC component of the films has been normalized to a thickness of 1 mil.

In FIG. 1: The line plotted along and through the points designated as the solid square represents the data from a prior art film of vinyl chloride-polyvinylidene chloride copolymer (HB Saran). The line plotted along and through the points designated as the open diamonds represents the data from another prior art film from a polyvinylidene chloride-methyl acrylate copolymer containing Mg(OH)$_2$ and EVA; 7½–8% by weight MA; 1.5% by weight Mg(OH)$_2$ and 3% by weight EVA. The line plotted along and through the points designated as the darkened square with white dots represents data from a film of the invention comprising MA-PVdC copolymer substantially free of EVA and containing 7½–8% by weight MA, and 1.5% by weight Mg(OH)$_2$ as a stabilizer. The line plotted along and through the points designated as solid diamonds represents data from a film of the invention comprising MA-PVdC copolymer, substantially free of EVA, and containing 7½–8% by weight MA and 1% by weight epoxidized linseed oil (ELO) as a stabilizer. The line plotted along and through the points designated as open squares with black dots represents data from another film of the invention comprising MA-PVdC copolymer, substantially free of EVA, and containing 7½–8% by weight MA, and 1.5% by weight ELO.

FIG. 1 graphically illustrates that with methyl acrylate-polyvinylidene chloride copolymer films which contain EVA and polyvinylidene chloride-vinyl chloride films there is a significant decrease in gas, particularly oxygen barrier properties after retorting. In contrast, films of the present invention maintain their high gas barrier properties when subjected to (both during and after) retorting conditions.

We claim:

1. A file comprising polyvinylidene chloridemethyl acrylate copolymers which are substantially free of ethylene vinyl acetate, and which contain a stabilizer selected from epoxidized linseed oil, magnesium hydroxide, magnesium oxide, tetrasodium pyrophosphate, epoxidized soybean oil, bisphenol A/epichlorohydrin, or a mixture thereof, said film having high gas barrier properties which are substantially maintained after conditions of retorting at an elevated temperature.

2. The film according to claim 1 wherein the methyl acrylate is present in an amount between 3% and 8% by weight.

3. The film according to claim 2 wherein the methyl acrylate is present in an amount between 6% and 8% by weight.

4. The film according to claim 1 wherein the stabilizer is epoxidized linseed oil.

5. The film according to claim 2 wherein the epoxidized linseed oil is present in an amount of from 0.5% to 3% by weight.

6. The film according to claim 5 wherein the epoxidized linseed oil is present in an amount of from 1.0% to 1.5% by weight.

7. The film according to claim 1 wherein the stabilizer is magnesium hydroxide.

8. The film according to claim 7 wherein the magnesium hydroxide is present in an amount of from 0.5% to 3% by weight.

9. The film according to claim 7 wherein the magnesium hydroxide is present in an amount of from 1.0% to 1.5% by weight.

\* \* \* \* \*